Patented May 9, 1933

1,907,764

UNITED STATES PATENT OFFICE

ALBERT K. EPSTEIN AND BENJAMIN R. HARRIS, OF CHICAGO, ILLINOIS

BREAD IMPROVING PROCESS AND PRODUCT

No Drawing.   Application filed February 18, 1931.  Serial No. 516,826.

Our invention relates to improvements in making bread, and particularly in producing a bread having improved color.

The invention is directed toward producing a better color in the bread, by improving the texture and grain thereof, which we have determined has a greater whitening effect than any other factor.

In the process of baking bread in which yeast is used for fermenting the dough batch, various changes take place of a bio-chemical and physio-chemical nature, which alter and change the character of the gluten and other constituents of the flour so as to make the gluten more extensible and to change the water imbibing capacity thereof. This phenomena, known as the "maturing of the gluten", is caused by the various enzymes as well as acids produced as the end products of fermentation, as well as various oxidase and preoxidase phenomena which occur during the fermentation period.

The various changes taking place are very complex and there are a number of factors which contribute to the proper maturing of the gluten, which will produce a bread of the best color, grain and texture. If the gluten is undermatured, the grain will be coarse and irregular and the walls of the cells surrounding the gas spaces will be thick, the volume will be relatively small, and the color will be on the yellow side. If, on the other hand, the product is over-matured, the gluten will be weakened. When this condition exists, the carbon-dioxide will expand and rupture the cells when the dough is placed in the oven, thus producing a bread having a poor color, grain and texture.

The color of the bread is of course determined to some extent by the color of the flour itself, but the color is determined very largely by the nature and size of the air cells as well as the thickness of the cell walls and the reflection of the light on the surface of the cut bread. It follows that bread with a poor texture and grain will have poor color whether made with bleached or unbleached flour. On the other hand, bread having a fine texture and grain, in which the gluten is properly matured, will have a better color.

Among the factors which contribute very greatly to the color of the bread, is the proper maturing of the gluten by oxidation. Ordinary flour contains some oxidizing enzymes, and when made into bread these enzymes undoubtedly have some effect on the color. The amount of natural flour enzymes is so small, however, that the change in color due thereto is probably imperceptible.

The principal object of our present invention is the production of a bread having an improved color, texture and grain.

Another object is to bring about a greater and more satisfactory maturing of the gluten.

Another object is to mature the gluten by oxidation by the use of relatively small amounts of oxidizing enzymes.

Another object is the provision of improved sources of oxidizing enzymes.

Another object is to provide a whitening preparation which may be vended to baking establishments for direct introduction to the dough batch, the preparation being furnished in such a way as to require substantially no technical understanding on the part of the baker of the complex chemical principles involved.

Another object is the provision of a whitening agent which will be effective in very small quantities.

Another object is the provision of a whitening agent which may be used with substantially any other bread ingredients without difficulty.

We have discovered that relatively small amounts of oxidizing enzymes may be used in bread, together will very small amounts of certain chemical substances of our discovery to cause a very much improved maturing of the gluten and better color of the baked loaf is obtained. It is our belief that these substances, which are certain salts, function as activating agents, and we have termed them catalysts for convenience of description. That they are true catalysts we have not proven beyond possibility of error, due to the complex nature of their action, but we do know that they have the effect of greatly increasing the activity of the oxidizing enzymes, thus enabling us to obtain a very much improved maturing of the gluten with relatively small amounts of oxidizing enzymes present.

As a source of oxidizing enzymes, we may use many vegetable substances, some of which have never been used before in bread, and others of which have never been used in the same way and for the same purpose. A more detailed explanation of the vegetable substances which may be used, the catalysts for activating the oxidizing enzymes present in such substances, and the manner of carrying out the invention, will now be made.

As a source of oxidizing enzymes we may use any vegetable material in which these substances are found in sufficient amounts. Soy beans have been found to contain relatively large amounts of oxidizing enzymes and so are suited to our purpose. We may also use other beans and bean-like materials which are found in a substantially dry state, thus affording certain advantages in practical economy of preparation, shipping and the like. We may also use with very great satisfaction certain ground plants, including the root vegetables and the so-called tubers. Not all of these ground plants are suitable in a practical way, because although substantially all of them contain some oxidizing enzymes, in some cases the enzymes are present in such small proportions as to make the use of the vegetable undesirable from a practical point of view. As an example of the more desirable root vegetables, we cite white sugar beets and white turnips. Others of these groups, although containing substantial amounts of oxidizing enzymes may be unsuited for other reasons. For example, they may under certain circumstances introduce an undesirable taste into the bread. In other cases, the vegetable although edible, may not impress the trade and consuming public generally as a most suitable constituent of bread. Horseradish is an example of a vegetable which contains substantial amounts of oxidizing enzymes, but which might not be a thoroughly satisfactory ingredient of bread for some of the reasons cited.

As activators or catalysts we may employ substantially all of the edible oxidizing agents, many of which have been used in bread heretofore for other purposes but in greater concentrations than employed by us. Of these chemical agents, the alkali metal salts of the halogens such as the chlorates and bromates of sodium and potassium have been found exceedingly suitable to our purpose. Salts which have metal ions, which can change from a lower to a higher valance, such as manganous chloride and ferrous chloride and their equivalents are also suitable. In addition, we can use such compounds as ammonium persulphate, potassium persulphate and calcium peroxide. These substances are effective in exceedingly small amounts to activate the oxidizing enzymes when present therewith during the fermentation period of the bread dough. For example, we have found that with suitable amounts of oxidizing enzymes, the addition of .0005% of bromate on the basis of the flour employed, will produce a very great improvement and whitening of the bread by bringing about a very satisfactory maturing of the gluten by oxidation.

As to the use of soy beans in bread, we are aware that soy bean flour has been used heretofore and at least in baking practices as carried out in certain countries, the use of soy bean flour as an ingredient for whitening purposes of the bread is common practice. The use of soy bean flour is disclosed, for example, by D'Arbouet. In Revue Generale Des Colloides, Vol. IV, pages 97 to 99 and 104 to 107, D'Arbouet points out that the use of soy bean flour in bread has been the subject of investigation and he recommends the use of not more than 2% of soy bean flour. However, he suggests no possible way of increasing the activity of the oxidizing enzymes present. We have found that we can use about ⅛ of the amount of soy bean flour as that suggested by D'Arbouet, with a suitable catalyst and obtained at least as good results by the use of the smaller amount.

As a particular example of the use of the invention with soy beans, with each 100 lbs. of flour we use one-quarter of a pound of ground soy beans and .0005% of sodium bromate based upon the flour and obtain a resultant bread having a very good texture, grain and color and flavor. Thus, the joint action of the trace of bromate and the enzymes present in the small amount of soy beans produces an effect much greater than if either substance is used by itself. In place of the bromate as a catalyst in the above example, we may use from .001% to .0001% of manganous chloride.

When employing a ground plant vegetable as a source of oxidases and peroxidases, we may employ the whole vegetable or we may make water or alcohol extracts thereof with any of the catalysts disclosed hereinabove and very good maturing of the gluten with the resulting whitening is obtained. We may also employ extracts of soy beans in order to introduce the enzymes in more concentrated form. Care must be taken in making concentrates either from soy beans or the ground plants, to use a process which will not impair the activity of the enzymes or destroy them in any substantial amounts. Excessive heat, for example, should be avoided.

In our co-pending application, Serial #490,089, filed October 20, 1930, we disclose the use of soy beans in bread but for another purpose. We have found that soy beans contain at least two types of enzymes, namely, urease as well as the oxidases and peroxidases. Our present invention should not be confounded with any process wherein the soy beans are used as a source of urease. It just happens in the case of soy beans that the same substance contains relatively large amounts of both types of enzymes. Most vegetable substances, however, are found not to be so rich in these two enzymes. The ground plants treated of above, for example, are found for the most part to be relatively rich in oxidizing enzymes, but in most cases with only a trace, if any, of urease present. Certain of the fungi, which are relatively rich in urease are substantially without oxidizing enzymes.

We are aware that potatoes have been used heretofore in bread making. We have found, however, that potatoes have not been used in such a way as to take any advantage of them as a source of oxidases and peroxidases. While not so rich in these enzymes as some of the other vegetables, we have found, however, that we may use potatoes for our purpose.

Some of the substances which we employ as catalysts for the oxidases and peroxidases have been used heretofore in the manufacture of bread. Ammonium persulphate and calcium peroxide, for example, have been used in bread in relatively larger proportions than employed by us in order to increase the water imbibing capacity of flour, due to their chemical action on the constituents of the bread. In no case, however, have these substances been employed as now disclosed by us for the purpose of so increasing the activity of relatively small amounts of oxidizing enzymes as to produce unusually good and unexpected results.

We have found that we can produce a composition of matter, which can be added directly to the dough batch so as to be present during the fermentation period, in a dry state; and the dry preparation may be vended through the usual avenues of commerce to the bakers, with directions requiring a minimum of technical supervision. A suitable form is a package containing approximately 25 lbs. of ground soy beans, .005 lbs. of potassium bromate and enough filler such as flour or starch to make a 100% package. This is vended to the baker with instructions that it is to be used approximately 1 lb. with 100 pounds of flour.

It will be recalled that the acid produced as the end product of fermentation has an effect in maturing the gluten to obtain a better color, grain and texture of the baked loaf. It has been found that small amounts of inorganic acids may be introduced into the bread dough with satisfactory results on the texture, grain and color. We may employ small amounts of acid substances directly with our preparation, or we may employ a compound such as ammonium chloride, which produces an accumulating acid residue during the progress of the fermentation. This compound, besides having an acid residue, functions as a yeast food by giving up ammonia to the yeast, thus increasing the yeast metabolism and increasing yeast activity.

One very satisfactory practical way of carrying out our invention is in conjunction with the process described in our co-pending application, Serial No. 490,089, filed October 20, 1930. A product, adapted for use for the simultaneous practice of both methods may be produced and vended to the trade through the usual trade channels. The presence of urease and oxidases and per-oxidases, together in soy beans renders the employment of the two methods concomitantly, by the use of a single composition very satisfactory and practical. It must be borne in mind, however, that separate vegetable products may be used as sources of the two types of enzymes.

In a prior invention of Epstein, Patent No. 1,657,379, the use of a yeast assimilable substance, such as urea, containing organic nitrogen was described. We found, however, that the liberation of the nitrogenous compound (ammonia) from the urea was increased by the use therewith of urease, specifically as found in soy beans, certain fungi, etc. This has the result of increasing the yeast proliferation and promoting yeast metabolism during the fermentation period, particularly when the dough contained some readily available carbohydrate material. Practically, the invention results in decreasing the fermentation period, or the production of a more rounded loaf when the usual amount of yeast is employed; or it permits obtaining the production of a well rounded loaf in the standard fermentation period but with less yeast. Thus a saving can be made in yeast, or fermentation time, or a loaf of greater volume obtained.

In order to obtain a more progressive liberation of ammonia and control the activity of the urease, we employ a relatively small amount of salt (sodium chloride). The normal amount of salt present in the bread dough is sufficient, and when the straight dough method is employed, the salt will of course be present. In using the sponge process, however, some salt should be added to the sponge batter. (It may be stated here, also, that some readily available carbohydrate material should be used in the sponge batter.) An electrolyte such as common salt may, and should be included with the product which is supplied to the bakers for use with the method, as the salt inhibits the action of the urease on the urea in the dry state. This is important if the product is to be kept for any appreciable length of time. It will be understood that due allowance should be made for the amount of salt incorporated in the dry product when the bread dough is prepared. It is found that for example, calcium sulphate or phosphate have a similar effect.

In another form of the invention we substitute relatively small amounts of ammonium chloride for the acid phosphate. When ammonium chloride is used, the amount of urea may be decreased as the ammonium chloride supplies some ammonia to the yeast. Ammonium chloride differs from acid phosphate as a source of acid principally in that the acid is produced as a residue thereof when ammonium chloride is used and is not present during the entire fermentation period but develops gradually and accumulates as the ammonia is given up to the yeast during their proliferation. While it may not be desirable to have too great an amount of free acid present in the bread when the fermentation period starts, I have found that a relatively small amount of an acid substance may have a very desirable effect in producing the most favorable hydrogen ion concentration for obtaining the best yeast and enzyme action in connection with certain types of flour. As a practical and specific example of a composition which may and has been used with very good results, we illustrate the following formula: calcium sulphate, 4 lbs. 10½ oz., potassium chlorate, 22$\frac{7}{10}$ grams, sodium chloride, 6 lb. 4 oz., urea, 1 lb. 8¾ oz., acid phosphate, 1 lb. 13 oz., soy bean flour (ground whole soy beans) 12 lbs. 8 oz., processed corn flour, 23 lbs. 4 oz., total—50 lbs.

We may modify the above formula by employing ammonium chloride for example, to take the place of some of the urea as a source of yeast nitrogen. For example, we may use from 12 to 14 oz. of urea with approximately 1 lb. 8 oz. of ammonium chloride, the amount of filler being modified if desired to produce 50 lbs. The other constituents could remain unchanged. Should it be desired to employ ammonium chloride to take the place of all of the urea, from 2½ to 3 lbs. of the ammonium chloride can be used in the above formula. In this case it may be desirable to reduce the amount of acid phosphate.

In all of these formulæ, care is taken to allow a reasonable margin of safety in the commercial use of the process. Since over-maturing of the gluten is a result to be avoided, the ingredients should not be used preferably in such quantities as to cause too rapid biological chemical actions, which might produce unfavorable results, or which would require too close supervision for the ordinary commercial establishment.

What we claim as new and desire to protect by Letters Patent of the United States is:

1. The method of producing an improved bread which comprises supplying to a dough batch during the fermentation period a relatively small amount of a vegetable product containing oxidizing enzymes and a catalyst insufficient in itself to effect a bleaching action on the flour for activating the said enzymes.

2. The method of producing an improved bread which comprises supplying to a dough batch during the fermentation period, a relatively small amount of a vegetable product containing oxidizing enzymes, and a small amount of a catalyst selected from the group consisting of edible salts which have metal ions which can change from a lower to a higher valence, and the oxidizing alkali metal salts of the halogens, said amount insufficient in itself to effect a bleaching action on the flour.

3. The method of producing an improved bread which comprises supplying to a dough batch during the fermentation period, a relatively small amount of a vegetable product containing oxidizing enzymes, said vegetable product being from phaseolus vulgaris group, and a relatively small amount of a catalyst insufficient in itself to effect a bleaching action on the flour for activating the oxidizing enzymes, said catalyst being selected from the group consisting of edible salts which can change from a lower to a high valence and the oxidizing alkali metal salts of the halogens.

4. The method of producing an improved bread, which comprises supplying to the dough batch during the fermentation period, a relatively small amount of oxidizing enzymes and an amount of an oxidizing agent insufficient in itself to have a bleaching action but sufficient to activate the oxidizing enzymes in the dough batch.

5. The method of producing an improved bread, which comprises supplying to the dough batch during the fermentation period, a relatively small amount of oxidizing enzymes, and a catalyst selected from a group consisting of oxidizing alkali metal salts of the halogens, and salts having metal ions capable of changing from a lower to a higher valence, said catalyst being used in an amount insufficient in itself to have a bleaching action.

6. The method of producing an improved bread, which comprises supplying to a dough batch during the fermentation period a relatively small amount of oxidizing enzymes and a relatively small amount of bromate insufficient in itself to have a bleaching action but sufficient to activate the oxidizing enzymes.

7. The method of producing an improved bread, which comprises supplying to a dough batch during the fermentation period a relatively small amount of oxidizing enzymes and a relatively small amount of chlorate insufficient in itself to have a bleaching action.

8. The method of producing an improved bread, which comprises supplying to a dough batch during the fermentation period a relatively small amount of soy bean flour containing oxidizing enzymes, and a relatively small amount of an oxidizing agent insufficient in itself to have a bleaching action.

9. The method of producing an improved bread, which comprises supplying to a dough batch during the fermentation period a relatively small amount of soy bean flour containing oxidizing enzymes, and a relatively small amount of a catalyst selected from a group consisting of oxidizing alkali metal salts of the halogens and salts having metal ions capable of changing from a lower to a higher valence, said catalyst being used in an amount insufficient to have a bleaching action in itself, but in a sufficient amount to activate the enzymes.

10. The method of producing an improved bread, which comprises supplying to a dough batch during the fermentation period a relatively small amount of soy bean flour containing oxidizing enzymes, and a relatively small amount of a bromate insufficient in itself to have a bleaching action.

11. The method of producing an improved bread, which comprises supplying to a dough batch during the fermentation period a relatively small amount of soy bean flour containing oxidizing enzymes, and a relatively small amount of a chlorate insufficient in itself to have a bleaching action.

12. The method of producing an improved bread, which comprises supplying to a dough batch during the fermentation period, an amount of soy beans containing oxidizing enzymes equal to about one-quarter percent of the amount of flour employed in the dough batch, and approximately .0005% of sodium bromate.

13. A product adapted to be introduced into bread dough before the completion of the fermentation period thereof for the purpose of imparting a better color to the final bread composition, said composition including a vegetable substance containing oxidizing enzymes and a relatively small amount of an oxidizing agent insufficient in itself to have a bleaching action.

14. A composition adapted to be introduced into bread dough before the completion of the fermentation thereof for imparting a better color to the final bread product, said composition including soy bean substance containing oxidizing enzymes, and a relatively small amount of an oxidizing agent for activating the said enzymes said amount being insufficient when introduced into a dough batch to have a bleaching action.

15. A composition adapted to be introduced into bread dough before the completion of the fermentation thereof for imparting a better color to the final bread product, said composition including soy bean substance having oxidizing enzymes, and a relatively small amount of a catalyst selected from a group consisting of oxidizing alkali metal salts of the halogens and salts having metal ions capable of changing from a lower to a higher valence the catalyst being present in an amount insufficient in itself to have a bleaching action when introduced into a dough batch.

16. A bread improving preparation including urea, urease, oxidizing enzymes and a substance for activating the oxidizing enzymes said activating substance being present in an amount insufficient in itself to have a bleaching action when the preparation is introduced into a dough batch.

17. A bread improving preparation including soy bean flour, containing oxidizing enzymes, urea, and an oxidizing agent in an amount insufficient in itself to have a bleaching action.

18. A bread improving preparation including calcium sulphate, soy bean flour containing oxidizing enzymes, urea, a relatively small amount of an oxidizing agent, sodium chloride and an edible acid phosphate said oxidizing agent being present in an amount insufficient in itself to have a bleaching action.

19. A bread improving preparation, including calcium sulphate, soy bean flour containing an oxidizing enzyme, ammonium chloride, urea, a relatively small amount of an oxidizing agent, sodium chloride, and calcium acid phosphate said oxidizing agent being present in an amount insufficient in itself to have a bleaching action.

20. A method of producing an improved bread, which comprises supplying to a dough batch during the fermentation period a relatively small amount of oxidizing enzymes and a relatively small amount of manganous chloride said manganous chloride being used in an amount insufficient in itself to have a bleaching action.

In witness whereof, we hereunto subscribe our names this 19th day of January, 1931.

ALBERT K. EPSTEIN.
BENJAMIN R. HARRIS.